March 4, 1941.  E. M. TOLMAN  2,233,879
PHOTOMETRIC METHOD AND APPARATUS
Filed April 2, 1938
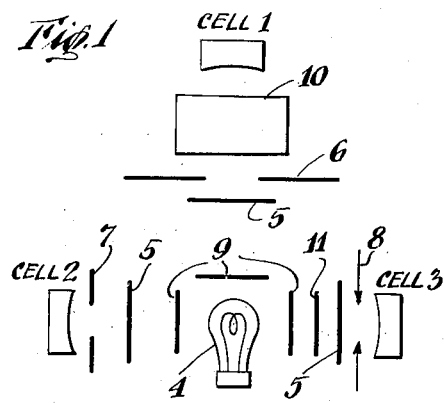
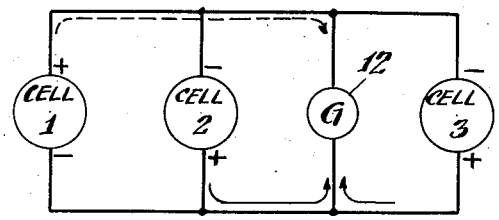
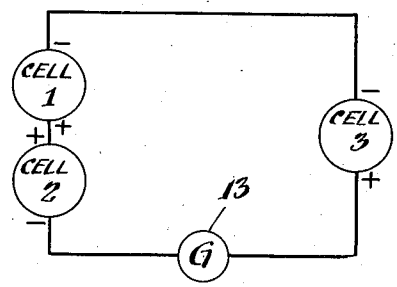
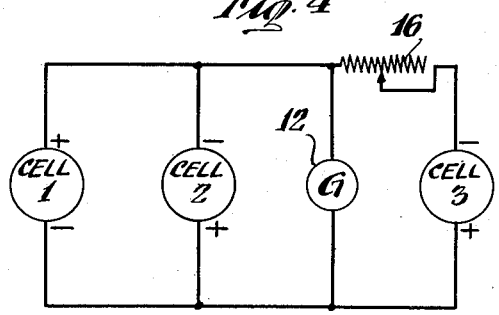
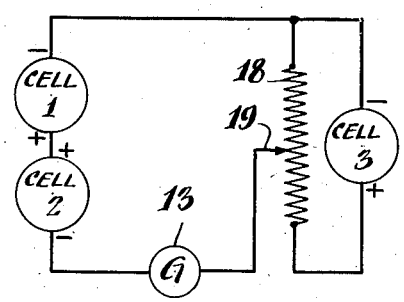
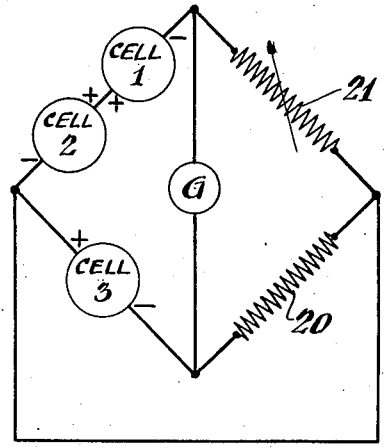
INVENTOR
Edward M. Tolman
BY Ridsdale Ellis
his ATTORNEY Patented Mar. 4, 1941

2,233,879

UNITED STATES PATENT OFFICE 2,233,879

PHOTOMETRIC METHOD AND APPARATUS

Edward Merrill Tolman, New York, N. Y.

Application April 2, 1938, Serial No. 199,737

5 Claims. (Cl. 88—14)

This invention relates to photometric methods and apparatus for measuring the light transmitter by a medium to be tested and has for its object improvement of the sensitiveness and accuracy of such methods and apparatus.

Water absorbs a part of a beam of light passed therethrough. This absorption is increased by substances dissolved therein, especially by those which give colored solutions. By measuring the proportion of the incident light which passes through a colored solution its concentration can be determined. Heretofore the chief disadvantage of such colorimetric methods of analysis has been their lack of sensitiveness and accuracy. This is particularly true of relatively highly concentrated solutions, since generally speaking the concentration is directly proportional to the logarithm of the incident light divided by the emergent light (the absorption density of the medium). As a result of this law, the more opaque the solution, the greater the accuracy of light measurement required for determining the concentration within fixed limits of accuracy. The above law holds for solutions in which there is no alteration in color caused by chemical changes resultant from variations in concentration.

While the primary purpose of my invention is the measurement of light transmitted through colored solutions, it is also applicable to the measurement of the light transmitted by suspensions or turbid liquids and to the determination of the percentage of light reflected by solid objects, etc. Hence, where the term "light transmitted" is used, it is intended to include transmission by reflection from solid surfaces, as well as transmission through a solution or translucent material.

Broadly speaking, the invention involves the use of a fixed photoelectric effect nearly equal to the photoelectric effect to be measured and balancing the two by means of a variable photoelectric effect.

I have found that photoelectric cells of the blocking layer selenium type are particularly suitable for carrying my invention into effect, although other types of cells may also be used. For example, vacuum or gas filled cells may be employed provided the necessary external source of E. M. F. and other necessary equipment is supplied.

The variation of the variable photoelectric effect may be brought about optically or electrically. That is to say, the quantity of light striking a photoelectric cell may be varied to change the voltage or current produced by such cell or the quantity of light may be kept constant and the effective voltage or current varied by suitably arranged rheostats, etc. The simplest and generally most satisfactory method is the optical one.

The following specific example of one method of carrying the invention into effect will probably give a clearer picture of the underlying principle than a statement of the principle itself. Assume that light from a single source of substantially fixed intensity after passing through the medium to be tested produces in a photoelectric cell a voltage ranging from 112 to 120 microvolts, according to the composition of the medium. A second photoelectric cell is arranged so that, when illuminated from the same source of light it produces a voltage of 110 microvolts.

A third photoelectric cell is arranged so that the light it receives from the same source can be varied so as to give voltages ranging from 1 to 12 microvolts. The three cells are connected in series in a closed circuit including the galvanometer with the first cell in opposition to the other two cells. By adjusting the illumination of the third photoelectric cell the sum of the voltages of cells 2 and 3 can be made equal to that of cell 1, as indicated in the following table:

| First cell | Second cell | Third cell |
|---|---|---|
| 112 | 110 | 2 |
| 116 | 110 | 6 |
| 120 | 110 | 10 |

The balance point can, of course, be determined by a galvanometer in a well-known manner.

By such an arrangement an increase of 6.7% in the light transmitted through the medium to be tested corresponds with an increase of 500% in the light striking the third cell. Variation in light striking the third cell can be readily made in such a way as to enable a relative numerical measure thereof to be made. For example, the distance between the source of light and the third cell may be kept constant and the quantity of light varied by an iris or other type of diaphragm operated by a graduated dial or the like. Again, the quantity of light may be varied by moving the cell towards or away from the source of light along a graduated track.

Filters which absorb infra red radiation greatly increase the accuracy and sensitivity of the apparatus and cut down the time required for an equilibrium point to be reached.

Sensitiveness can also be increased, especially in the case of dilute solutions, by means of color filters. A blue solution is blue because more red, orange and green light is absorbed than blue. In other words, a blue solution is more opaque to red light than blue. Hence a red filter would increase the sensitiveness of the method as applied to blue solutions.

Color filters are also of advantage in increasing the accuracy of the measurements. Incandescent electric lamps give off light which varies considerably with voltage, age and other factors as regards the relative proportions of red, green and blue light. If the medium tested transmits blue light in preference to red and green and no color filters are used with the two standard photoelectric cells, then an increase in the red : green ratio will give greater activation of the two standard cells than of the test cell. The use of three color filters of the same color, one in front of each of the three cells, eliminates such inequalities in activation. If storage batteries are used to light the lamp, such effects as mentioned above are greatly reduced.

Filters are also of service when my method is used to determine the end-point of indicator determinations or the pH of solutions containing an indicator by measuring their transparency to light of a particular wave length.

Photoelectric cells of the barrier layer selenium type do not give voltages which are in direct linear proportion to the quantity of light striking them. The increment in voltage for each increment in quantity of light becomes less and less as the light intensity increases. The same is true of the current output of such cells through high resistances. As the resistance falls, the current becomes more and more nearly a linear function of the quantity of light striking the cell. I prefer, therefore, to employ circuits involving a balance of substantially short-circuited currents in place of circuits involving a balance of voltages. When current balances are used a system of nearly equal currents balanced by variations in a third is employed in an exactly analogous manner to the system of voltage balances above described.

To obtain proportionately between the area of a diaphragm opening and the light passing therethrough on to a photoelectric cell it is necessary to place suitable light diffusing means between the source of light and the cell. The use of a frosted electric light bulb or a ground glass screen adjacent the source of light gives a fair degree of accuracy but a much nearer approach to strict proportionality is obtained by the use of opalescent glass or other diffusing media in which the light scattering is produced in the body of the diffusing medium. The diffusing medium should be at a considerable distance from the diaphragm and the latter should be reasonably close to the photoelectric cell.

A suitable form of apparatus and two forms of circuit connections therefor are illustrated diagrammatically, by way of example, in the accompanying drawing wherein:

Fig. 1 is a diagrammatic plan view of the apparatus without either the galvanometer or electric circuits;

Fig. 2 shows a circuit arrangement on the current balance principle, using optical control of the variable cell;

Fig. 3 shows a circuit arrangement on the voltage balance principle, using optical control of the variable cell;

Fig. 4 shows a circuit arrangement on the current balance principle, using electrical control of the variable cell;

Fig. 5 shows a circuit arrangement on the voltage balance principle, using electrical control of the variable cell; and Fig. 6 shows a further form of circuit using electrical control.

As shown, the apparatus includes a single source of light 4 and three photoelectric cells 1, 2, 3 illuminated thereby. Interposed between the cells and the light are color filters 5, opalescent screens 9 adjacent the light to give a linear relationship between the aperture opening and the photoelectric cell, and diaphragms 6, 7 and 8. A flat-sided glass vessel 10 is placed between the cell 1 and the adjacent diaphragm 5 to receive the solution or liquid to be tested. Cells 2 and 3 are the standard cells, cell 2 being the one whose activation is nearly the same as that of the test cell 1, while cell 3 is the variable one used to obtain the desired balance. Diaphragms 6 and 7 have apertures of fixed size. Fixed, that is to say, for any given test. However, when operating on highly colored and hence relatively opaque liquids a diaphragm 6 may be used having a larger opening therein than would be used when operating on relatively transparent liquids. Where optical control is used diaphragm 8 is made adjustable as regards the area of its opening so that by varying such area the algebraic sum of the activations of cells 2 and 3 can be made equal to activation of cell 1.

A wire mesh screen 11 may be used to vary the range of activation of the cell 3, that is, by placing in front of cell 3 a wire mesh screen having apertures with a total area of only 25% of the total area of the screen, the activation of the cell 3 for full opening of the diaphragm is only approximately 25% of what it would be if the screen was absent. This screen should be placed between the opalescent screen and the diaphragm. A ground-glass or light filter may be used in place of a wire mesh screen for the above purpose.

Where electrical control is used, the diaphragm 8 is either of fixed aperture or, if of variable aperture, it is used at one aperture opening only.

A circuit arrangement on the current-balance optical-control principle is shown in Fig. 2. A galvanometer 12, preferably of low resistance, is connected in parallel with the three cells. Cells 1 and 2 are connected so that a circulating current flows around the circuit connecting the two cells. There is also a tendency for current to flow from cell 1 to one side of the galvanometer (dotted line arrow) and from cell 2 to the other side of the galvanometer (full line arrow). Cell 3 is so connected that there is a tendency for current to flow to the same side of the galvanometer as the current from cell 2. A balance, i. e., a zero reading on the galvanometer, is reached when the tendency of current to flow in the direction of the full line arrows is equal to the tendency of current to flow in the direction of the dotted line arrow. This balance is obtained by opening or closing the diaphragm 8.

A circuit arrangement on the voltage-balance optical-control principle is shown in Fig. 3. In this case cells 1 and 2 are connected in series opposing and arranged so that the difference between their voltages may be balanced by that of cell 3, the balance point being determined by a galvanometer 13.

It will be noted that the standard cells 2 and 3 are so arranged that the activation of cell 3 is never more than a small fraction of that of cell 2. This difference in activation may be obtained in part at least by permanently locating cell 3 at a greater distance from the source of light than cell 2, or preferably by a wire mesh screen 11.

The operation of the apparatus in the manner described requires that the activation of cell 1 is not greatly different from that of cell 2. This relationship may be preserved for solutions of widely different degrees of transparency by constructing a series of diaphragms 7 with progressively increasing apertures and then selecting the one which will give cell 2 an activation of the same order of magnitude as that of cell 1, or alternatively a series of diaphragms 6 may be used for the same purpose.

Preferably the apparatus is so adjusted that the activation of cell 1 is greater than that of cell 2 and cell 3 is so connected that its effect is added arithmetically to that of cell 2. That relationship may, however, be reversed so that a balance is obtained by having cell 2 stronger than cell 1 and subtracting the effect of cell 3 from that of cell 2, or, what amounts to the same thing, adding the effect of cell 3 to that of cell 1.

By keeping the distances between the lamp 4 and the cells 2 and 3 constant and by keeping the opening in diaphragm 7 constant, the dial which operates the diaphragm 8 may be graduated so as to give a direct reading of the sum of the quantities of light striking cells 2 and 3, multiplied by a constant dependent upon the intensity of the source of light, the density of the filters and other like factors.

The circuit shown in Fig. 4 is similar to that of Fig. 2 except for the addition of a rheostat 16 for varying the proportion of current generated by the cell 3 which reaches the remainder of the circuit. The desired current balance is obtained by adjusting the rheostat. The rheostat may be calibrated so that its readings give a numerical measure of the difference in activation of cells 1 and 2.

The circuit shown in Fig. 5 is similar to that of Fig. 3 except that the cell 3 has a high resistance shunt 18 around it and the desired variable voltage is obtained by a sliding tap connection 19 from the galvanometer to the resistance shunt.

The circuit shown in Fig. 6 is the well-known Wheatstone bridge with a fixed resistance 20 and a variable resistance 21.

It will be understood that in place of a single lamp a plurality of lamps could be used, provided that there is substantial equality of light emission or, at least, a constant light emission ratio.

It will be evident that various modifications could be made in the circuits shown without departing from the spirit of the invention.

What is claimed is:

1. The method of measuring the light transmitted by a medium to be tested including placing a photoelectric cell illuminated by light transmitted by such medium in electrical opposition to a standard photoelectric cell under conditions of nearly equal activation and measuring the difference in activation between the two cells by varying the electrical effect of a second standard cell in electrical opposition to one of the above-mentioned cells, while maintaining the electrical effect of the first standard cell constant, until an electrical balance is reached between two of the cells with respect to the third.

2. The method of measuring the light transmitted by a medium to be tested including electrically balancing a photoelectric cell illuminated by light transmitted by such medium against two standard photoelectric cells by varying the electrical effect of one of the standard cells in electrical opposition to one of the other two cells by a variable resistance while maintaining constant the electrical effect of the other standard cell at a value nearly equal to the electrical effect of the test cell and measuring a factor proportional to such variation in electrical effect of the first standard cell.

3. The method of measuring the light transmitted by a medium to be tested including electrically balancing a photoelectric cell illuminated by light transmitted by such medium against two standard photoelectric cells by varying the quantity of light received by one of the standard cells in electrical opposition to one of the other two cells while maintaining constant the quantity of light received by the other standard cell at a value nearly equal to the electrical effect of the test cell and measuring the variation in quantity of light received by the first standard cell.

4. Apparatus for measuring the light transmitted through a medium to be tested comprising a source of light, a photoelectric cell illuminated by light from said source transmitted by such medium, two standard photoelectric cells arranged to receive light from said source, a galvanometer, one of said standard cells having an electrical output nearly equal to that of the test cell and being connected in opposition to the test cell, all three cells being connected in parallel with respect to the galvanometer, and means for varying the current output of the other of the standard cells, while maintaining the current output of the first standard cell constant, until current ceases to flow through the galvanometer.

5. Apparatus for measuring the light transmitted through a medium to be tested comprising a source of light, a photoelectric cell illuminated by light from said source transmitted by such medium, two standard photoelectric cells arranged to receive light from said source, a galvanometer, one of said standard cells having an electrical output nearly equal to that of the test cell and being connected in opposition to the test cell, all three cells being connected in parallel with respect to the galvanometer, and means for varying the quantity of light received by the other standard cell, while maintaining the electrical effect of the first standard cell constant, until current ceases to flow through the galvanometer.

EDWARD MERRILL TOLMAN.